United States Patent
Harrang et al.

(10) Patent No.: US 9,698,897 B2
(45) Date of Patent: Jul. 4, 2017

(54) METHOD AND SYSTEM FOR AUDITING AND CORRECTING CELLULAR ANTENNA COVERAGE PATTERNS

(71) Applicant: Nokia Networks US SON LLC, Bothell, WA (US)

(72) Inventors: Jeffrey Paul Harrang, Sammamish, WA (US); David James Ryan, Bothell, WA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 13 days.

(21) Appl. No.: 14/968,810

(22) Filed: Dec. 14, 2015

(65) Prior Publication Data

US 2016/0099771 A1    Apr. 7, 2016

Related U.S. Application Data (63) Continuation of application No. 13/892,206, filed on May 10, 2013, now abandoned.

(60) Provisional application No. 61/645,308, filed on May 10, 2012.

(51) Int. Cl.
| | | |
|---|---|---|
| *H04W 24/10* | (2009.01) | |
| *H04W 24/02* | (2009.01) | |
| *H04B 7/26* | (2006.01) | |

(52) U.S. Cl.
CPC .......... *H04B 7/2606* (2013.01); *H04W 24/02* (2013.01); *H04W 24/10* (2013.01)

(58) Field of Classification Search
CPC ..... H04B 7/2606; H04W 24/02; H04W 24/10

USPC ......................................................... 455/418
See application file for complete search history.

(56) References Cited

U.S. PATENT DOCUMENTS

| | | | | |
|---|---|---|---|---|
| 2002/0009992 | A1* | 1/2002 | Jensen .................. | H04W 16/18 455/446 |
| 2003/0087635 | A1* | 5/2003 | Sheffield ............... | H04W 16/18 455/423 |
| 2009/0023477 | A1* | 1/2009 | Staudte ................. | H04W 16/28 455/562.1 |
| 2010/0105398 | A1* | 4/2010 | Engstrom ............. | H04W 16/18 455/446 |
| 2010/0112952 | A1* | 5/2010 | Molnar ................. | H01Q 1/246 455/63.1 |
| 2010/0298015 | A1* | 11/2010 | Medbo ................. | H04B 7/0617 455/501 |
| 2011/0070908 | A1* | 3/2011 | Garcia Cabezas .... | H04W 16/28 455/507 |
| 2011/0136478 | A1* | 6/2011 | Trigui ................... | H04W 24/02 455/418 |
| 2011/0212720 | A1* | 9/2011 | Hamalainen ........ | H04L 41/0677 455/423 |
| 2012/0069773 | A1* | 3/2012 | Bobier .................. | H04W 16/04 370/255 |
| 2012/0108199 | A1* | 5/2012 | Wang .................... | H04W 24/10 455/405 |

(Continued)

*Primary Examiner* — Nathan Taylor (57) ABSTRACT

A method for adjusting a base station antenna may include receiving measured data including signal strength data for a signal received from the base station and location data from one or more user equipment, receiving planned radio coverage data, comparing the measured data with the planned radio coverage data, generating adjustment parameters based on a result of the comparison, and adjusting the antenna based on the adjustment parameters.

16 Claims, 9 Drawing Sheets

(56) References Cited

U.S. PATENT DOCUMENTS

2014/0087716 A1* 3/2014 Vaderna ................. H04L 43/50
455/422.1

* cited by examiner

METHOD AND SYSTEM FOR AUDITING AND CORRECTING CELLULAR ANTENNA COVERAGE PATTERNS

CROSS-REFERENCES TO RELATED APPLICATIONS

The present invention is a continuation of and claims priority to U.S. application Ser. No. 13/892,206, filed May 10, 2013, which claims priority to and is a non-provisional of U.S. Application No. 61/645,308, filed May 10, 2012. That application is herein incorporated by reference for all purposes.

BACKGROUND OF THE INVENTION

Cellular wireless networks such as GSM, UMTS, and LTE mostly rely on antennas for proper cellular coverage. Typically, base stations in a cellular network have three antennas, and a cellular network includes many base stations located in an area. Optimal coverage may be planned by an operator in order to minimize gaps in coverage and co-channel interference, to provide an appropriate level of wireless resources, to account for geographical constraints, etc. The direction of the antennas is part of a coverage plan, and in order to implement a coverage plan, the antennas of each base station are precisely oriented. Deviations between planned orientation and actual orientation can result in gaps in coverage, inadequate wireless resources for certain areas, and other problems that a coverage plan is intended to minimize.

Conventionally, surveillance of actual cellular antenna configurations may be conducted through a manual audit, or drive test. In such an audit, network operators may send vehicles with technicians and specially calibrated equipment to various locations in coverage areas of the network base stations where the cellular antennas are installed to capture measurements on the antenna configurations. These audits can be expensive and time consuming. Because of the resources required to conduct such audits, it is not practical to conduct them on a regular basis. If they are not performed correctly, it may be difficult to detect and correct errors. In addition, it is not practical to perform such manual audits to detect changes to antenna configuration over time.

BRIEF SUMMARY OF THE INVENTION

Embodiments of the present invention may overcome one or more of the problems identified above. In particular, various embodiments provide an apparatus, system and method which facilitate automated processes for auditing an antenna configuration and identifying a misconfigured antenna. Embodiments reduce the time and cost associated with these activities, so that it may be practical to detect antenna misconfiguration on a periodic basis, or with minimal interaction from an operator. Aspects of the present invention may be embodied in a method, a system, or a non-transitory computer readable medium.

In an embodiment, a method for auditing a configuration of a cellular antenna of a base station includes receiving measured data including signal strength data for a signal received from the base station and location data from one or more user equipment, receiving planned radio coverage data, comparing the measured data with the planned radio coverage data, and generating adjustment parameters based on a result of the comparison. The cellular antenna may be a steerable antenna that is automatically adjusted based on adjustment parameters, and information from a plurality of UE may be received.

Examples of the signal strength data include Reference Signal Received Power (RSRP), Reference Signal Received Quality (RSRQ), Reference Signal Code Power (RSCP), Received Signal Strength Indication (RSSI), or a combination thereof. Examples of the planned radio coverage data include an identifier for the cellular antenna, a position of the cellular antenna, and a power level of the cellular antenna. Examples of adjustment parameters include a transmit power parameter, an azimuth boresight parameter, and a beamwidth parameter.

Comparing the measured data with the planned radio coverage data may include calculating a fit value and comparing the fit value to a threshold value. A method may further include adjusting the planned radio coverage data according to the adjustment parameters and comparing the adjusted planned radio coverage data to the measured data.

In an embodiment, comparing the adjusted planned radio coverage data to the measured data includes calculating a second fit value and comparing the second fit value to the threshold value. Generating adjustment parameters, adjusting the planned radio coverage data, and comparing the adjusted planned radio coverage data to the measured data may be iterated until a match is determined.

Comparing the measured data with the planned radio coverage data may include generating a planned grid including estimated signal strength values at latitude and longitude coordinates, and generating a measured data grid including measured signal strength values at latitude and longitude coordinates.

In an embodiment, the plurality of user equipment are handheld devices. For example, the plurality of user equipment may be cellular communication devices, each of which has a software application for transmitting the measured signal strength data stored thereon.

The foregoing summary is illustrative only and is not intended to be in any way limiting. Various embodiments are provided and described in order to facilitate clear understanding through specific examples. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description.

DETAILED DESCRIPTION OF THE INVENTION

In the following detailed description, reference is made to the accompanying drawings, which form a part of the description. The example embodiments described in the detailed description, drawings, and claims are not meant to be limiting. Other embodiments may be utilized, and other changes may be made, without departing from the spirit or scope of the subject matter presented herein. It will be understood that the aspects of the present disclosure, as generally described herein and illustrated in the drawings, may be arranged, substituted, combined, separated, and designed in a wide variety of different configurations.

Figure 1:
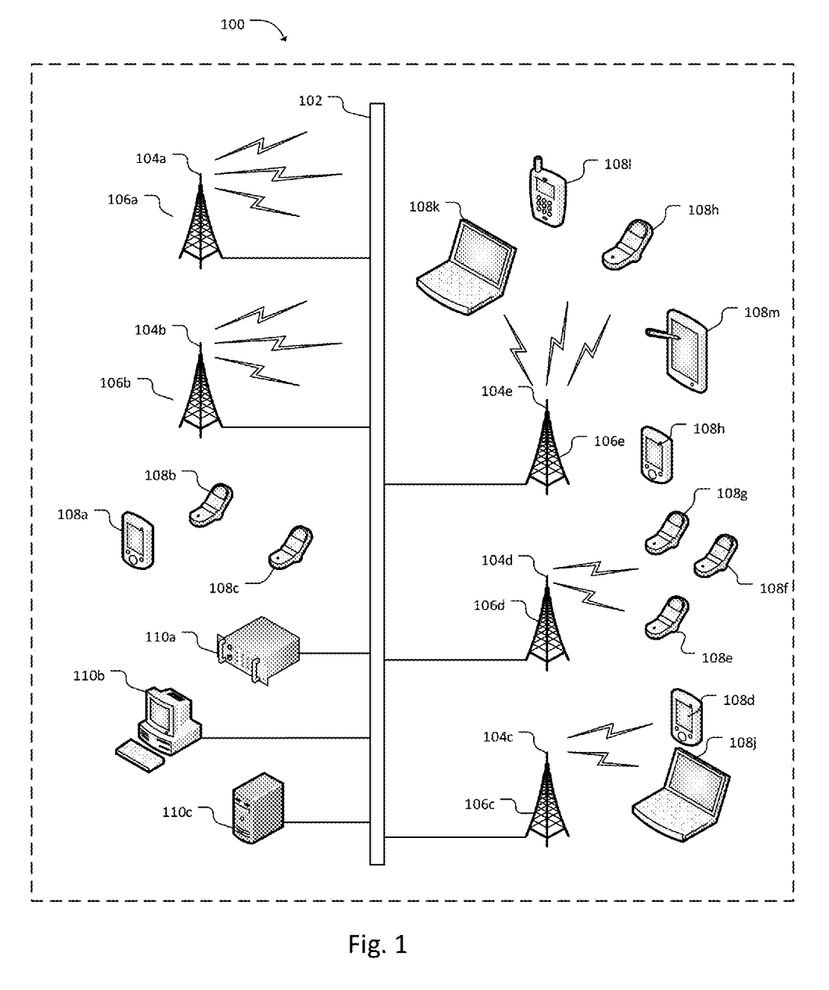
FIG. 1 illustrates a networked computing system according to an embodiment of the invention.

FIG. 1 illustrates an example networked computing system 100 for implementing auditing and correcting base station antenna configuration, arranged in accordance with at least some embodiments described herein. As depicted, system 100 may include a data communications network 102, one or more network base stations 106a-e, one or more base station antennas 104a-e, one or more network controller devices 110a-c, and one or more User Equipment (UE) 108a-m.

In system 100, the data communications network 102 may include a backhaul portion that can facilitate distributed network communications between any of the network controller devices 110 a-c and any of the network base stations 106a-e. Any of the network controller devices 110a-c may be Network Resource Controllers (NRCs) or have NRC functionality. Any of the network base stations 106a-e may be NRCs or have NRC functionality that may share overlapping wireless coverage with one or more neighboring base stations within a particular region of the networked computing system 100. The one or more UE 108a-m may include cell phone/PDA devices 108a-i, laptop/netbook computers 108j-k, handheld gaming units 108l, electronic book devices or tablet PCs 108m, and any other type of common portable wireless computing device that may be provided with wireless communications service by any of the network base stations 106a-e.

As would be understood by those skilled in the Art, in most digital communications networks, the backhaul portion of a data communications network 102 may include intermediate links between a backbone of the network which are generally wire line, and sub networks or network base stations 106a-e located at the periphery of the network. For example, cellular user equipment (e.g., any of UE 108a-m) communicating with one or more network base stations 106a-e may constitute a local sub network. The network connection between any of the network base stations 106a-e and the rest of the world may initiate with a link to the backhaul portion of an access provider's communications network 102 (e.g., via a point of presence).

In an embodiment of the invention, any of the network controller devices 110a-c, and/or network base stations 106a-e may have NRC functionality or be considered as an NRC. An NRC may facilitate all or part of the functions associated with various embodiments of the invention. An NRC is a physical entity that may include software components. In accordance with an embodiment of the invention, an NRC may be a physical device, such as one of network controller devices 110a-c or one of network base stations 106a-e. In yet another embodiment, an NRC that performs a particular function of the invention may be a logical software-based entity that can be stored in the volatile or non-volatile memory or memories, or more generally in a non-transitory computer readable medium, of a physical device such as any of network controller devices 110a-c or of network base stations 106a-e.

In accordance with various embodiments of the invention, an NRC has presence and functionality that may be defined by the processes it is capable of carrying out. Accordingly, the conceptual entity that is the NRC may be generally defined by its role in performing processes associated with embodiments of the invention. Therefore, depending on the particular embodiment, the NRC entity may be considered to be either a physical device, and/or a software component that is stored in the computer readable media such as volatile or non-volatile memories of one or more communicating device(s) within the networked computing system 100.

In an embodiment of the invention, any of the network controller devices 110a-c and/or network base stations 106a-e may function independently or collaboratively to implement any of the auditing and correcting processes associated with various embodiments of the invention. Further, any of the processes for auditing and correcting base station antenna configuration may be carried out via any common communications technology known in the Art, such as those associated with modern Global Systems for Mobile (GSM), Universal Mobile Telecommunications System (UMTS), Long Term Evolution (LTE) network infrastructures, etc.

In accordance with a standard GSM network, any of the network controller devices 110a-c (NRC devices or other devices optionally having NRC functionality) may be associated with a base station controller (BSC), a mobile switching center (MSC), or any other common service provider control device known in the art, such as a radio resource manager (RRM). In accordance with a standard UMTS network, any of the network controller devices 110a-c (optionally having NRC functionality) may be associated with a network resource controller (NRC), a serving GPRS support node (SGSN), or any other common network controller device known in the art, such as a radio resource manager (RRM). In accordance with a standard LTE network, any of the network controller devices 110a-c (optionally having NRC functionality) may be associated with an eNodeB base station, a mobility management entity (MME), or any other common network controller device known in the art, such as an RRM.

In a wireless network, the number of UEs attached to a particular base station is a function of the number of active users in the base station's coverage area. If a large number of users are closer to a particular base station than its neighbors, the particular base station may have a larger number of UEs attached to it than its neighbors do, even though some of the UEs are within service range of the neighboring base stations. For example, with reference to elements of FIG. 1, base station 106a has fewer active attached UE than neighboring base stations 106b and 106e.

In an embodiment, any of the network controller devices 110a-c, the network base stations 106a-e, as well as any of the UE 108a-m may be configured to run any well-known operating system, including, but not limited to: Microsoft® Windows®, Mac OS®, Google® Chrome®, Linux®, Unix®, or any mobile operating system, including Symbian®, Palm®, Windows Mobile®, Google® Android®, Mobile Linux®, etc. In an embodiment of the invention, any of the network controller devices 110a-c, or any of the network base stations 106a-e may employ any number of common server, desktop, laptop, and personal computing devices.

In an embodiment of the invention, any of the UE 108a-m may be associated with any combination of common mobile computing devices (e.g., laptop computers, netbook computers, tablet computers, cellular phones, PDAs, handheld gaming units, electronic book devices, personal music players, MiFi™ devices, video recorders, etc.), having wireless communications capabilities employing any common wireless data communications technology, including, but not limited to: GSM, UMTS, 3GPP LTE, LTE Advanced, WiMAX, etc.

In an embodiment, the backhaul portion of the data communications network 102 of FIG. 1 may employ any of the following common communications technologies: optical fiber, coaxial cable, twisted pair cable, Ethernet cable, and power-line cable, along with any other wireless communication technology known in the art. In context with various embodiments of the invention, it should be understood that wireless communications coverage associated with various data communication technologies (e.g., network base stations 106a-e) typically vary between different service provider networks based on the type of network and the system infrastructure deployed within a particular region of a network (e.g., differences between GSM, UMTS, LTE, LTE Advanced, and WiMAX based networks and the technologies deployed in each network type).

In an embodiment of the invention, any of the network controller devices 110a-c, the network base stations 106a-e, and UE 108a-m may include any standard computing software and hardware necessary for processing, storing, and communicating data between each other within the networked computing system 100. The computing hardware realized by any of the network computing system 100 devices (e.g., any of devices 106a-e, 108a-m, 110a-c) may include: one or more processors, volatile and non-volatile memories, user interfaces, transcoders, modems, wireline and/or wireless communications transceivers, etc. Further, any of the networked computing system 100 devices (e.g., any of devices 106a-e, 108a-m, 110a-c) may include one or more computer readable media encoded with a set of computer readable instructions, which when executed, can perform a portion of the functions associated with various embodiments of the invention.

In an embodiment, UE 108a-m measures location data and signal strength data associated with one or more antenna 104, and wirelessly transmits the data to a base station 106. The base station 106 may perform a portion of the processes according to embodiments of the present invention, and may transmit data to network controller devices 110 which may perform one or more processes.

Figure 2:
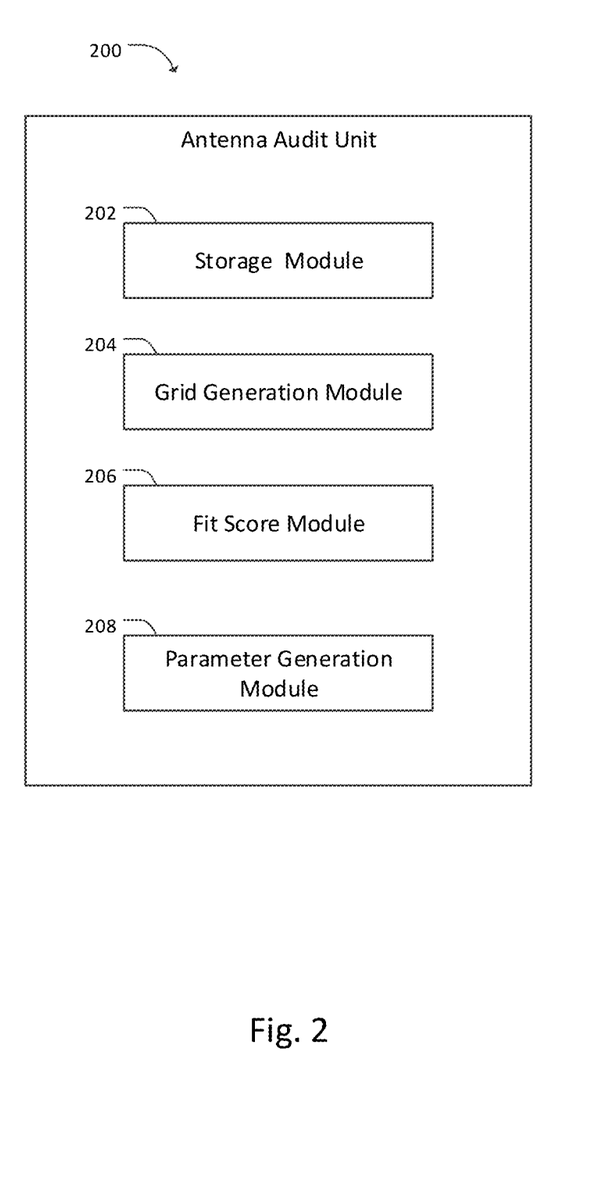
FIG. 2 illustrates an antenna audit unit according to an embodiment of the invention.

FIG. 2 shows an antenna audit unit 200 according to an embodiment of the present invention. As shown in FIG. 2, an antenna audit unit 200 may include a storage module 202 which stores data received from UE, planned configuration data, and additional information generated during an auditing process. Audit unit 200 may further include a grid generation module 204 configured to generate grids using plan data and measured data, as explained in more detail below.

Additional modules that may be included in Audit unit 200 include a fit score module 206 configured to generate a fit score, and a parameter generation module 208 which is configured to generate adjustment parameters for adjusting a cellular antenna. Although modules 202-208 are shown in a single location in FIG. 2, in various embodiments, each module, or components of each module, may be located in one or more piece of network equipment such as the base stations 106 and network controlling devices 110 shown in FIG. 1.

Figure 3:
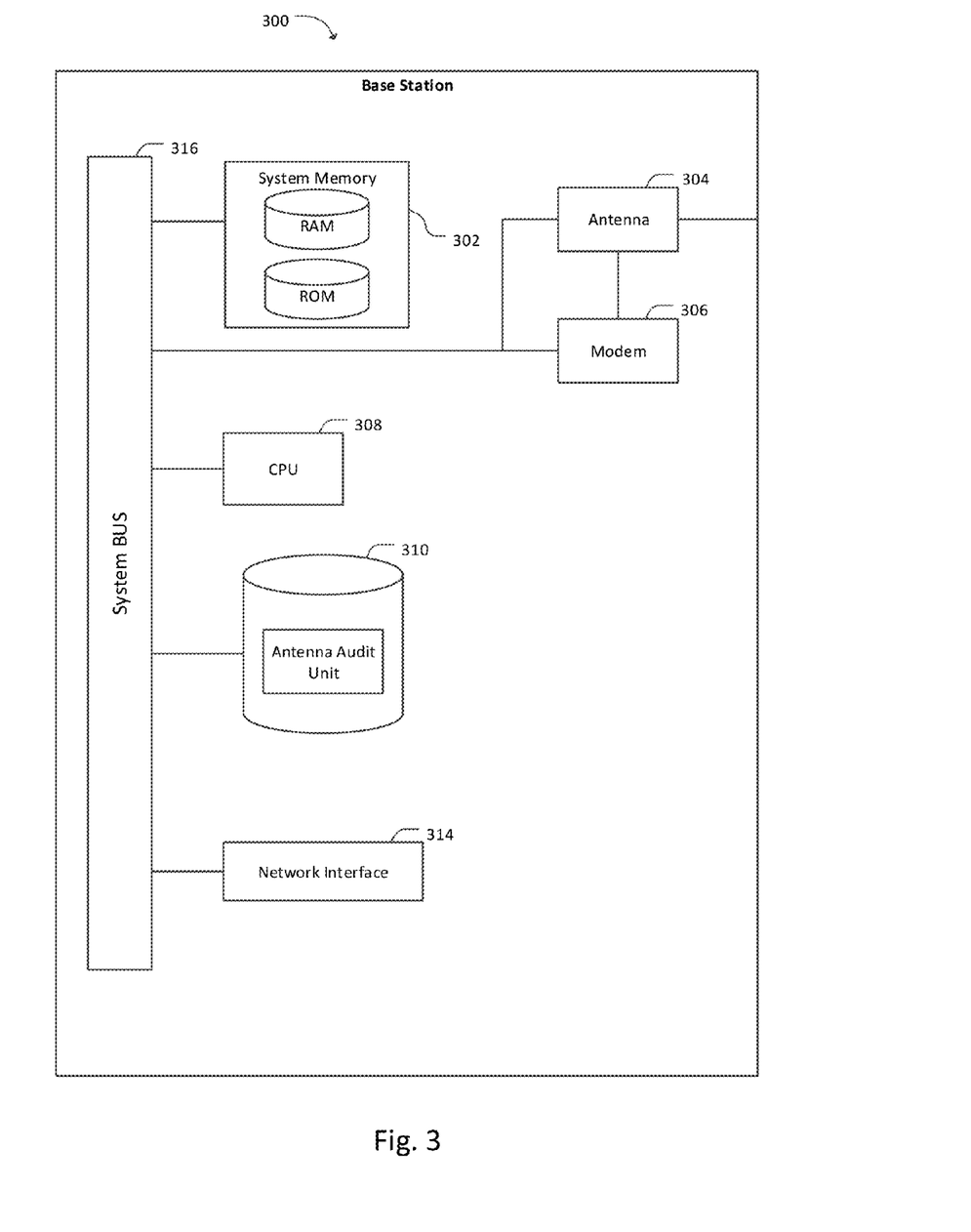
FIG. 3 illustrates a base station according to an embodiment of the invention.

FIG. 3 illustrates a base station 300 according to embodiments of the invention. Base station 300 may be any base station 106 shown in FIG. 1.

The network base station 300 may also include one or more data processing devices including a central processing unit (CPU) 308. In an embodiment, CPU 308 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 308 may execute computer programs stored on the network base station's 300 volatile (RAM) and non-volatile (e.g., ROM) system memories 302, or in storage 310. Storage 310 may include one or more module of antenna audit unit 200.

Storage 308 may comprise volatile or non-volatile memory such as RAM, ROM, a solid state drive (SSD), SDRAM, or other optical, magnetic, or semiconductor memory. In an embodiment, storage 308 includes one or more modules for performing processes of an antenna audit unit, embodiments of which were discussed above with respect to FIG. 2.

The network base station 300 may also include a network interface component 314 that facilitates the network base station's 300 communication with the backhaul or wireless portions of the network computing system 100 of FIG. 1, a modem 306 for modulating an analog carrier signal to encode digital information and for demodulating a carrier signal to decode digital information, and a system bus 316 that facilitates data communications between the hardware resources of the network base station 300.

Base station 300 may include at least one antenna 304 for transmitting and receiving wireless communications to and from devices in wireless communication with the base station 300. In an embodiment of the invention, the base station antenna 304 may use any common modulation/encoding scheme known in the art, including, but not limited to Binary Phase Shift Keying, Quadrature Phase Shift Keying, and Quadrature Amplitude Modulation. Additionally, the network base station 300 may be configured to communicate with wireless equipment via any Cellular Data Communications Protocol, including any common LTE, LTE-Advanced, GSM, UMTS, or WiMAX protocol.

Antenna 304 may be associated with a plurality of parameters associated with characteristics of a cell, which may be evaluated and adjusted according to embodiments of the present invention. These parameters include beamwidth, boresight azimuth and downtilt (which may collectively referred to as "boresight,") transmit power, and height-above-terrain.

Each base station may serve a number of carriers operating on different respective frequencies, and includes a number of antennas which each have a physical coverage area. As used herein, the term "cell" refers to an area served by a single antenna for a given carrier frequency. The coverage area of a cell may relate to the signal strength of a particular carrier signal, such that the boundaries of the cell are defined by points at which the signal strength drops crosses a threshold value, or by points at which the interference rises above a threshold value.

Each cell is served by a given base station, so when UE is described as being attached to a cell, it is also attached to the particular base station 300 associated with the cell. A single base station may serve a plurality of cells, each of which has a separate, and possibly overlapping, coverage area.

Figure 4:
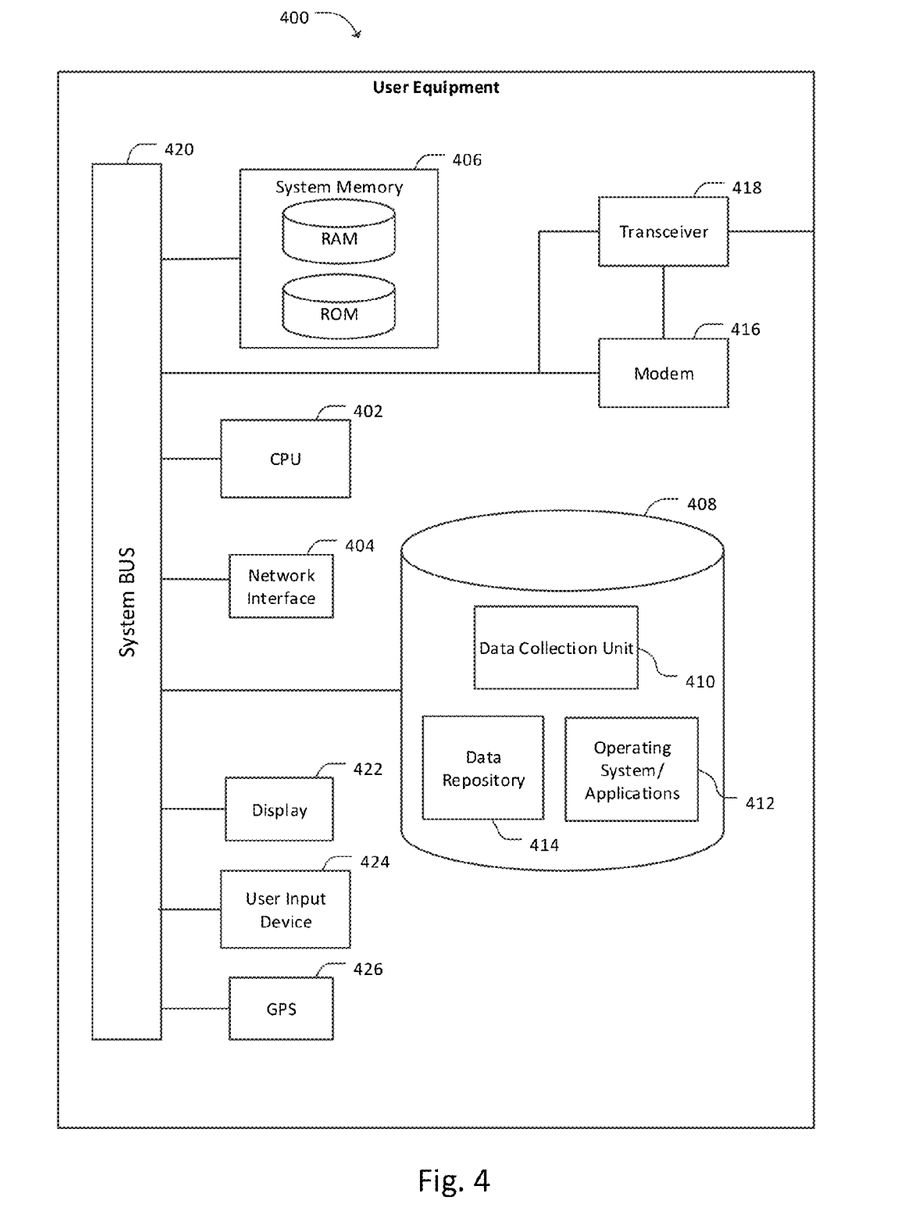
FIG. 4 illustrates user equipment according to an embodiment of the invention.

FIG. 4 illustrates user equipment (UE) 400 according to an embodiment of the present invention. UE 400 may include one or more data processing device such as central processing unit (CPU) 402. In an embodiment of the invention, the CPU 402 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 402 may be responsible for executing all computer programs stored on the user equipment's 400 volatile (RAM) and non-volatile (e.g., ROM) system memories 406 and storage 408.

UE 400 may also include a network interface component 404 that can facilitate communication between UE 400 and locally connected computing devices (e.g., a Personal Computer), a modem 416 for modulating an analog carrier signal to encode digital information and for demodulating a carrier signal to decode digital information, a wireless transceiver component 418 for transmitting and receiving wireless communications to and from a base station, a system bus 420 that facilitates data communications between hardware resources of UE 400, display unit 422 for displaying text or graphics information, a user input device 424 such as a keyboard, mouse, or touch-screen, GPS unit 426, and a storage 408. Storage 408 may include a data collection unit 410, an operating system/applications repository 412, and a data repository 414 storing various user equipment data.

In an embodiment, data collection unit 410 may measure and collect various UE data associated with auditing a base station antenna, including location data and signal strength data. The signal strength metrics measured and transmitted by the UE may include, for example, Reference Signal Received Power (RSRP), Reference Signal Received Quality (RSRQ), Reference Signal Code Power (RSCP), Received Signal Strength Indication (RSSI), EC/Io, Carrier to Interference plus Noise Ratio (CINR), Channel Quality Indicator (CQI), etc. In addition, the UE may collect and transmit information regarding the identity of each cell for which the signal strength data was measured. In an embodiment, this information may be collected for a target cell as well as one or more neighboring cells for the adjustment of an antenna associated with the target cell.

In an embodiment, data collection unit 410 and GPS 426 may cooperate with one or more application 412 in order to collect, store, and transmit location and signal strength information. For example, an application 412 may be installed by a user or an operator which is configured to measure signal strength, associate signal strength data with GPS coordinates at which the signal strength measurements were made, and transmit the signal strength data and associated GPS coordinates to a base station. In various embodiments, signal strength data may be automatically transmitted, for example at predetermined intervals, or be transmitted in response to a request received by the UE.

UE 400 may be purchased by a user or provided by an operator to a user. However, in embodiments of the present invention, UE is in the possession of users who may use the equipment for their marketed purposes, such as communicating with the Internet and other users. Accordingly, embodiments of the present invention can receive an amount of data that is not practical to collect with operator equipment, which facilitates the generation of highly accurate adjustment parameters. An operator is not a user.

Figure 5:
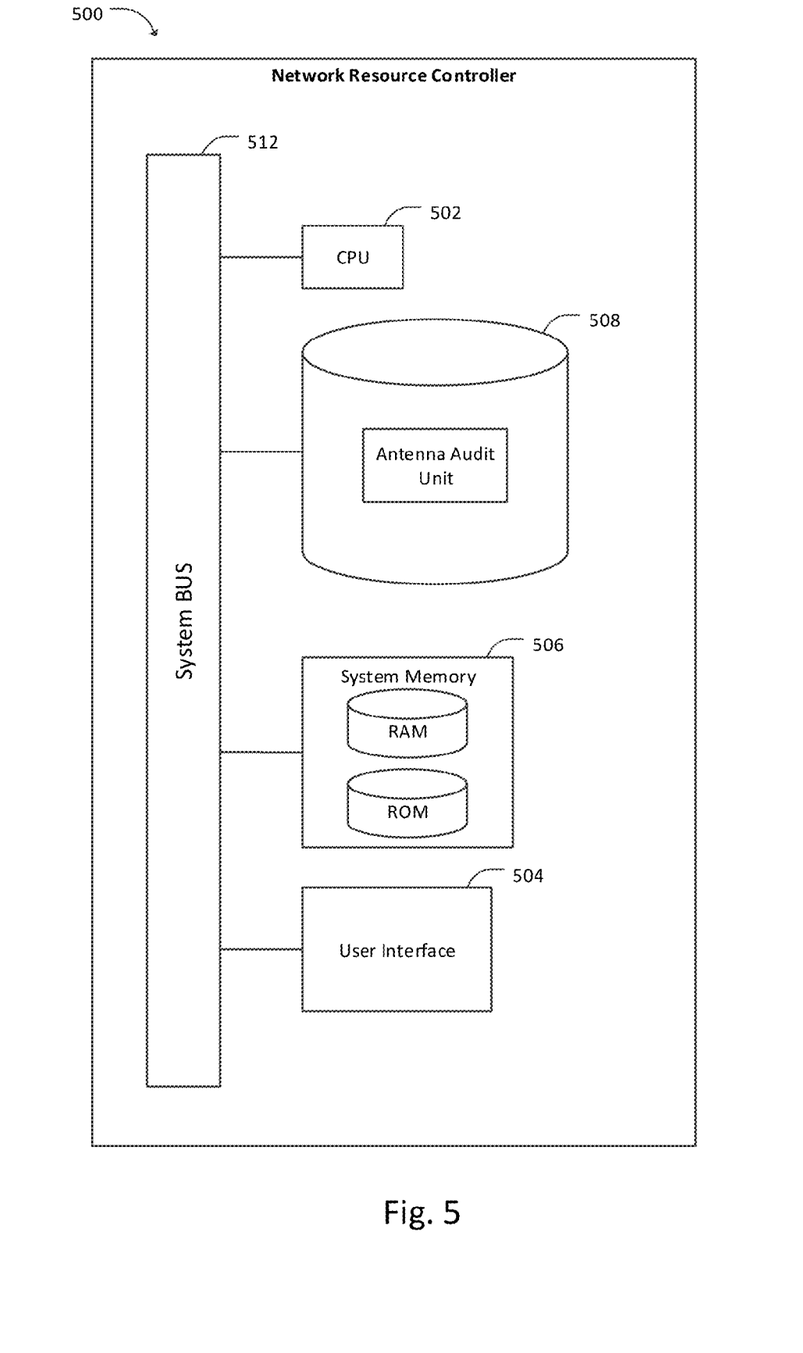
FIG. 5 illustrates a network resource controller according to an embodiment of the invention.

FIG. 5 shows a Network Resource Controller (NRC) 500 according to an embodiment of the present invention. In accordance with an embodiment of the invention, NRC 500 may be associated with any common base station or network controller device known in the Art, such as an LTE eNodeB (optionally comprising a wireless modem), RRM, MME, RNC, SGSN, BSC, MSC, etc. In an embodiment, NRC 500 is a Self-Organizing Network (SON) server.

NRC 500 may include one or more data processing device including a CPU 502. In an embodiment, CPU 502 may include an arithmetic logic unit (ALU, not shown) that performs arithmetic and logical operations and one or more control units (CUs, not shown) that extract instructions and stored content from memory and then execute and/or processes them, calling on the ALU when necessary during program execution. CPU 502 may be responsible for executing all computer programs stored on the NRC's 500 volatile (RAM) and non-volatile (e.g., ROM) system memories 506 and storage 508.

System memory 506 may comprise volatile or non-volatile memory such as RAM, ROM, a solid state drive (SSD), SDRAM, or other optical, magnetic, or semiconductor memory. Storage 508 may include one or more component of an antenna audit unit 200, which is explained in more detail with respect to FIG. 2 above.

NRC 500 may include a network interface/optional user interface component 504 that can facilitate the NRC's 500 communication with the backhaul portion or the wireless portions of network computing system 100 of FIG. 1, and may facilitate a user or network administrator accessing NRC's 500 hardware and/or software resources. NRC 500 may also include a system bus 512 that facilitates data communications between hardware resources of NRC 500.

Figure 6:
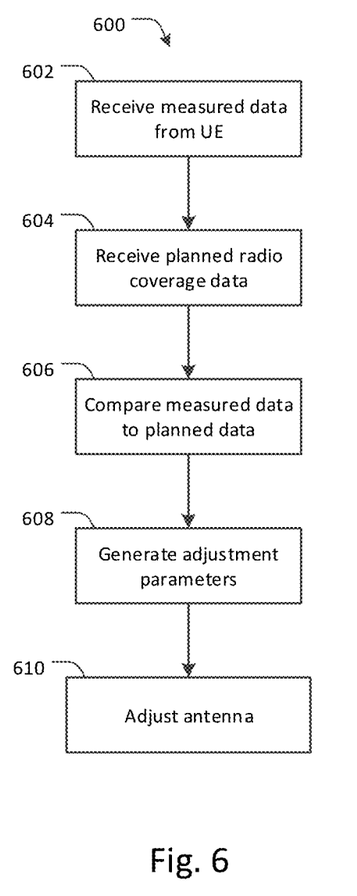
FIG. 6 illustrates a process for auditing and adjusting a cellular antenna according to an embodiment of the invention.

FIG. 6 shows a process 600 for auditing and adjusting a base station antenna. Process 600 of auditing and adjusting a base station antenna includes a process 602 of receiving measured data from UE. In an embodiment, the measured data is transmitted from UE which has measured the data to a base station, and is received by a component which includes one or more module associated with an Antenna Audit Unit 200. In various embodiments, the component may be a base station 300 or an NRC 500.

The measured data includes signal strength information, and may also include location data, such as latitude and longitude coordinates from a GPS reading and height-above-terrain. In other embodiments, location data may be derived from other techniques such as triangulation. For example, UE may send information including signal strength data to a plurality of base stations, and the base stations can use the signal strength data and locations of the base stations to estimate a UE's location. In such an embodiment, the location data sent from UE may be data that an NRC or other processing device uses to estimate the location at which the UE collected associated signal strength data.

Signal strength data may be, for example, RSRP, RSRQ, RSCP, RSSI, EC/Io, CINR, CQI, etc. In addition, information such as the identity of the cell for which signal strength information is collected, as well as the identity of neighboring cells, may be received from UE in process 602.

In process 604, a system component receives planned coverage data. Planned coverage data may be data generated by a radio planning tool in the process of planning optimal network coverage. In various embodiments, the planned coverage data may be generated by one or more component of the system, such as a network controller device.

The planned coverage data may include base station configuration information such as the boresight, signal power, location (i.e. latitude, longitude, and height), and the beamwidth of an antenna. In an embodiment, planned coverage data may include expected signal strength values at various locations, or grid points, within a cell. In other embodiments, expected signal strength values are calculated from the planned coverage data after the plan data is received.

In process 606, the data measured by UE and received in process 602 is compared to the planned radio coverage data received in process 604. In an embodiment, the comparison includes comparing measured data for grid points with planned data for the same grid points. The comparison process 606 is discussed in more detail with respect to FIG. 7.

In process 608, adjustment parameters are generated based on the results of comparison 606. The adjustment parameters are parameters for adjusting the configuration of an antenna so that the antenna more closely matches the planned configuration. Base station characteristics that may be adjusted by the parameters include the boresight, height-above-terrain, beamwidth, and transmission power.

In process 610, the antenna associated with the adjustment parameters of process 608 is adjusted using the parameters. Adjustments may be made manually, automatically, or by a combination of automatic and manual processes. In a manual adjustment, a technician visits the base station associated with the antenna, and physically interacts with the base station.

In some embodiments, automatic adjustment is possible. For example, some base stations are equipped with steerable antennas, which can be adjusted according to the adjustment parameters without direct human intervention. In an embodiment, the transmit power of an antenna may be adjusted by a technician at a remote location. The operator may first review the adjustment data in a correction profile, and approve, modify, or reject the adjustment data, before making adjustments. Similarly, beamwidth settings may be adjusted by any combination of manual and automatic processes.

Figure 7:
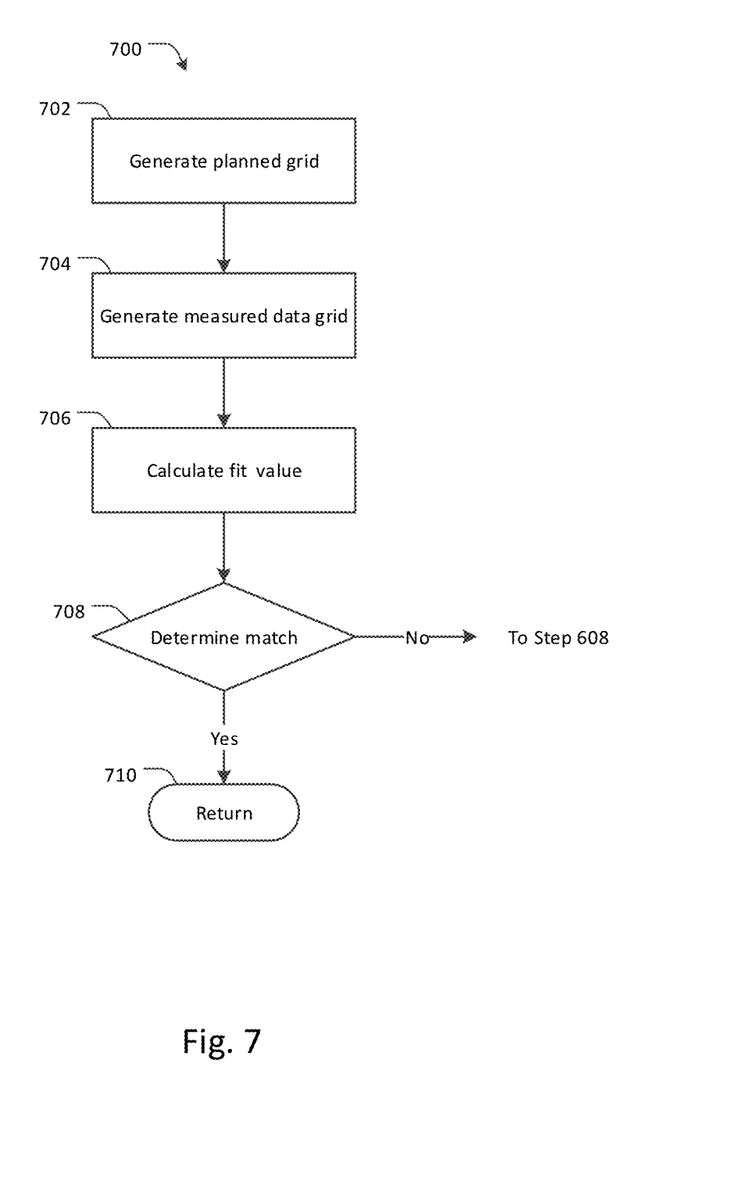
FIG. 7 illustrates a process for comparing data according to an embodiment of the invention.

FIG. 7 illustrates a process 700 of comparing measured data to planned data, which generally corresponds to process 606 of comparing measured data to planned data of FIG. 6. In process 702, a planned grid is generated. In an embodiment, the planned grid is be generated by a component of system 100, such as NRC 500.

Generating the planned grid 702 may include estimating expected signal strength levels for individual grid points within a cell based on planned coverage data. Divisions of the grid may be in units ranging, for example, from around one meter to tens of meters. Grid coordinates may be expressed in latitude and longitude values, as well as elevation or height-above-terrain values. In other words, depending on the embodiment, the grid may include points in either one, two, or three-dimensional space. The planned grid may be stored in a database which associates grid coordinates with expected signal strength values that are estimated based on antenna configuration values.

In process 704, a measured data grid is generated from the signal strength data and location data received from UE. In some embodiments, drive test data may also be used to generate the measured data grid. The measured data grid may be stored in a database which associates grid coordinates with signal strength values that are measured at locations corresponding to the grid coordinates, in one, two, or three-dimensional space. Accordingly, a measured data grid may include entries in a database which include latitude, longitude, a height, and a corresponding signal strength metric value.

Embodiments of the present invention are not limited to the particular processes of generating grid values discussed above. For example, in some embodiments, planned grid points may be calculated based on a planned map after receiving measured data, so that each planned grid point corresponds to a measured grid point. Other embodiments may use geometric calculations to compare non-matching grid points. Persons of skill in the art will recognize that other embodiments of generating comparison data are possible without departing from the scope of the present invention.

In process 706, a fit value is calculated for evaluating the accuracy of an antenna configuration. In an embodiment, the fit value is calculated by an NRC using an algorithm that processes each position point in the database that has a measurement, and sums an objective difference function between the planned and measured radio coverage metrics to arrive at a scalar fitting score for a base station antenna that has measured data available.

Process 708 determines whether the planned data matches the measured data. Determining a match may include comparing the fit value calculated in process 706 to a threshold value. For example, in an embodiment where a scalar fitting score is derived from the planned and measured radio coverage metrics of base station antenna, the scalar fitting score may be compared with a threshold score to determine whether significant differences exist between the measured configuration and planned configuration of the base station antenna. In an embodiment, a match may be determined if the fitting score is equal to or greater than the threshold value.

If the comparison determines that a match is present ("yes"), then no adjustment is performed, and the process proceeds to process 710. Process 710 indicates an end to the process, which may be repeated periodically or at particular times specified by an operator. If the comparison determines that a match is not present ("no"), then the associated antenna may be misconfigured. Accordingly, process 700 may proceed to process 608 of identifying adjustment parameters, which will be discussed in greater detail in the following description of an iterative process.

Figure 8:
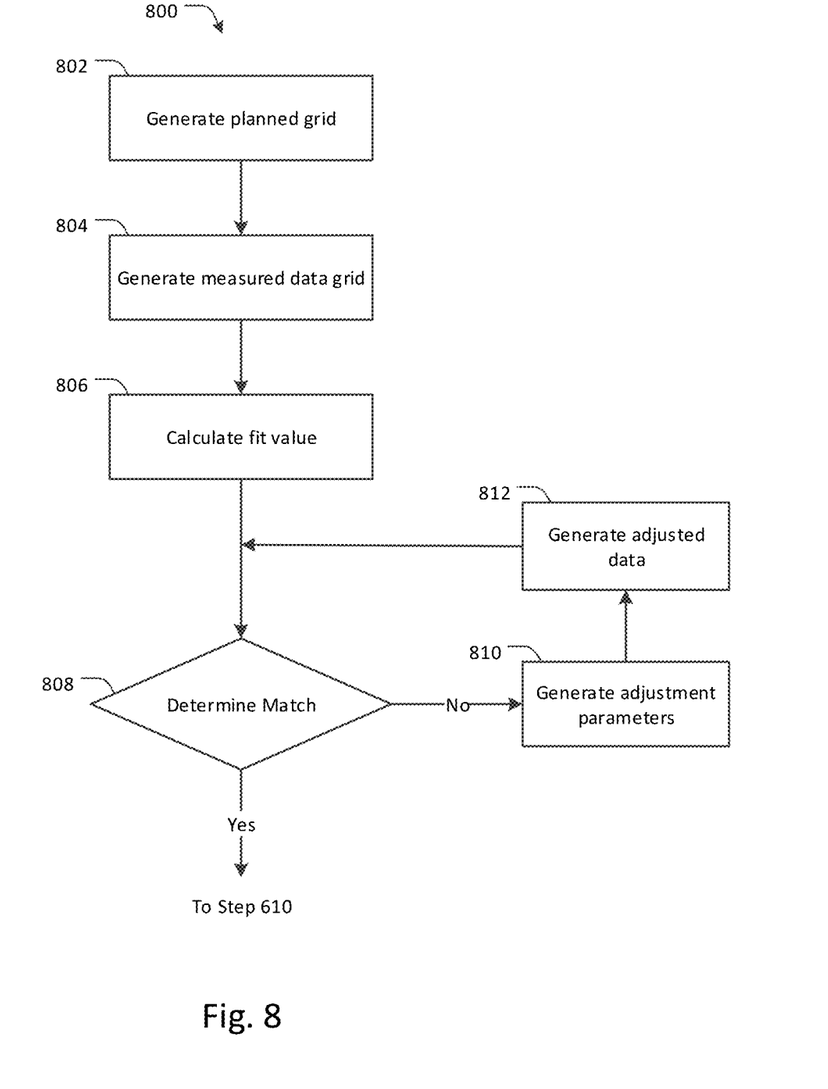
FIG. 8 illustrates an iterative process according to an embodiment of the invention.

FIG. 8 shows an iterative process 800 for generating adjustment parameters according to an embodiment of the present invention. Process 800 may include process 802 of generating a planned grid, a process 804 of generating a measured data grid, a process 806 of calculating a fit value, and a process 808 of determining whether a match is present, for example by comparing a fit value to a threshold value. These processes correspond to processes 702, 704, 706, and 708, respectively, which are explained above with respect to FIG. 7. In addition, these processes may correspond to process 606 of comparing measured data to planned data of FIG. 6.

If process 808 determines that a match is present, then process 800 may proceed to process 610 of adjusting the antenna. If process 808 determines that a match does not exist, then in process 810, adjustment parameters are generated.

In an embodiment, a process 810 of generating fit parameters may include manipulating the planned map algorithmically, for example by increasing or decreasing the antenna boresight, beamwidth angle, and transmit power parameters. It is understood that a variety of other known approaches to the pattern matching problem exist in one or more dimensions and that they could be used in various embodiments to accomplish the fitting procedure. Ranges in allowable antenna configuration metrics may be constrained by known physical specifications, antenna capabilities, or other practical limitations bounding the fitting parameters.

In an embodiment, the adjustment parameters may be generated automatically by a computing device such as an NRC 500. In another embodiment, the adjustment parameters may be entered manually by a technician.

In process 812, an adjusted coverage map is generated. The adjusted coverage data may be generated by applying the adjustment parameters from process 810 to the planned radio coverage data received in process 604. Process 812 may further include calculating a new grid using the adjusted data.

As seen in FIG. 8, after adjusted data is generated in process 812, process 800 returns to process 808 of determining whether a match is present. Accordingly, processes 808-812 may be iterated until a match is determined. Profiles that do not meet the match threshold criteria after fitting are discarded, while profiles for each fitted cell that meet the match threshold criteria are stored in a memory.

Although processes 810 and 812 have been described in the context of an iterative process 800, in other embodiments the processes can be performed only one time. In addition, processes 810 and 812 correspond to process 608 of generating adjustment parameters discussed above with respect to FIG. 6.

Figure 9A:
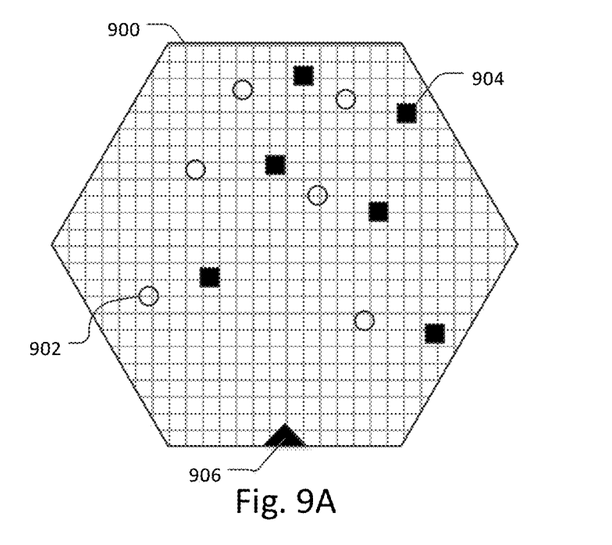
FIGS. 9A-B illustrate adjusting antenna parameters according to an embodiment of the invention.
Figure 9B:
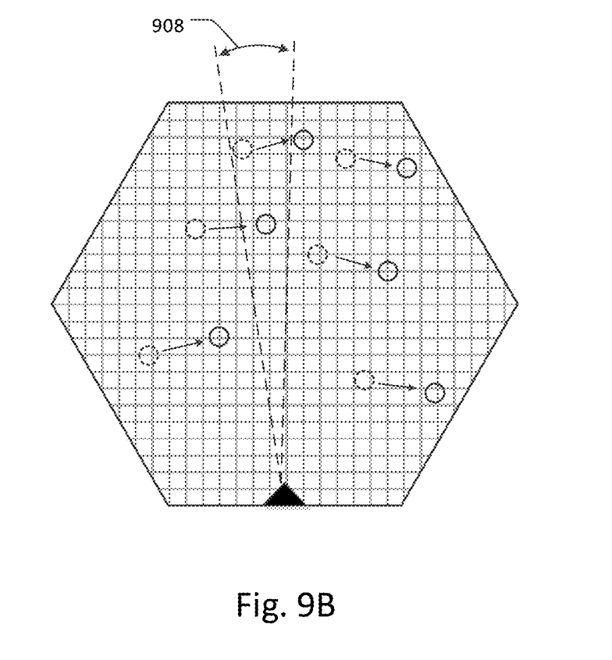

FIGS. 9A and 9B illustrate an example of adjusting parameters of a cellular antenna according to an embodiment of the present invention. FIGS. 9A and 9B are shown for illustrative purposes only, to help explain concepts of the present invention, and embodiments of the present invention are not limited by the particular details shown in the figures.

In FIG. 9A, cell 900 associated with an antenna 906 is depicted with an underlying grid of longitudinal and latitudinal grid points. The circles represent measured data points 902 corresponding to measured data received from one or more UE, and the black squares represent planned data points 904 derived from plan data. In particular, the planned data points 904 of FIG. 9A indicate locations at which signal strength values of measured data points 902 are expected to occur. For clarity of illustration, only the exactly matching points with equal radio metrics are shown.

A fitting score is derived from the difference in the values of the planned and measured metrics at the position of the observations. The fitting process may include iteratively recalculating a theoretical coverage map after making adjustments to the supposed pointing configuration of the transmitting base station antenna.

In FIG. 9B, a rotation 908 is applied to the antenna boresite azimuth based on adjustment parameters to correct a misconfiguration of antenna 906. As explained above, this process may be conducted iteratively to arrive at a best fit configuration, or a configuration that meets a match criterion. Accordingly, FIG. 9B may correspond to an iteration of a coverage map, or an actual adjustment to an antenna. Although not shown in the figures, it should be understood that other antenna pointing criteria such as downtilt, beamwidth, or other radio metrics such as transmit power could be analyzed to discover additional errors in the actual antenna pointing or radio configuration.

An auditing process according to embodiments of the present invention may be applied when an antenna is installed or adjusted. In addition, due to the automated nature of various processes, audits may be performed periodically to correct antenna misconfiguration resulting from changes resulting, for example, from a mechanical displacement of a base station antenna.

UE data may be measured and collected over relatively long periods of time, such as a day, a week, or longer. Many users may communicate with a cell over the time period, especially in high density areas. In addition, as discussed above, fitting processes may be performed iteratively to achieve best fit parameters. Accordingly, embodiments of the present invention are capable of performing an audit process with a high degree of accuracy.

In addition, the findings generated by embodiments of the present invention—for example, whether a base station antenna is misconfigured, and/or adjustments appropriate to fix the misconfiguration—can be used as inputs to other self-organizing-network (SON) algorithms for optimizing metrics indirectly or directly related to the configuration of the base station antenna.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting.

What is claimed is:

1. A method for auditing a base station in a wireless communication network to determine differences between stored parameters stored by the network and actual parameters of a misconfigured base station antenna, the method comprising:
   receiving measured data from one or more user equipment, the measured data including signal strength data for a signal transmitted by the antenna and received by the one or more user equipment and location data for a location of the one or more user equipment when the signal transmitted by the antenna was received;
   receiving the parameters for the antenna stored by the network;
   comparing the measured data to the stored parameters;
   generating adjustment parameters based on a result of the comparison;
   adjusting the antenna using the adjustment parameters to correct the misconfiguration
   adjusting the stored parameters according to the adjustment parameters; and
   comparing the adjusted parameters to the measured data,
   wherein comparing the measured data to the stored parameters includes calculating a fit value and comparing the fit value to a threshold value.

2. The method of claim 1, wherein the stored parameters are generated by a radio planning tool.

3. The method of claim 1, wherein the stored parameters are generated by a radio planning tool before the base station antenna is installed.

4. The method of claim 1, wherein the stored parameters include a boresight, a transmit power and a beamwidth of the antenna.

5. The method of claim 1, wherein the antenna is a steerable antenna, and wherein adjusting the antenna includes automatically adjusting the steerable antenna based on the adjustment parameters.

6. The method of claim 1, wherein comparing the adjusted parameters to the measured data includes calculating a second fit value and comparing the second fit value to the threshold value, and wherein generating the adjustment parameters, adjusting the stored parameters, and comparing the adjusted stored parameters to the measured data are iterated until a match is determined.

7. The method of claim 1, wherein the fit value is determined by generating a planned grid including estimated signal strength values at latitude and longitude coordinates, and generating a measured data grid including measured signal strength values at latitude and longitude coordinates, where the fit value corresponds to differences between the planned grid and the measured data grid.

8. The method of claim 1, wherein the one or more user equipment is a plurality of cellular communication devices, each of which has a software application instructing the cellular communication device to transmit the measured data to the base station.

9. The method of claim 1, wherein the stored parameters include an identifier for the antenna, a position of the antenna, and a power level of the antenna.

10. A cellular communications system that corrects a misconfigured antenna of a base station, the system comprising:
the base station having the misconfigured antenna that transmits a signal to a plurality of user equipment and receives measured data from the plurality of user equipment, the measured data including signal strength data of the signal and location data for each of the plurality of user equipment where the signal was received;
a memory that stores parameters for the antenna, there being a difference between the stored parameters and actual parameters of the antenna; and
a processor that compares the measured data to the stored parameters by calculating a fit value and comparing the fit value to a threshold value, and generates adjustment parameters for adjusting the antenna to correct the misconfiguration,
wherein the system adjusts the stored parameters according to the adjustment parameters, and compares the adjusted parameters to the measured data.

11. The cellular communications system of claim 10, wherein the stored parameters include an identifier for the antenna, a position of the antenna, and a power level of the antenna.

12. The cellular communications system of claim 10, wherein the stored parameters are generated by a radio planning tool before the base station antenna is installed.

13. The cellular communications system of claim 10, wherein the stored parameters include a boresight, a transmit power and a beamwidth of the antenna.

14. The cellular communications system of claim 10, wherein the processor calculates the fit value by generating a planned grid including estimated signal strength values at latitude and longitude coordinates, and generating a measured data grid including measured signal strength values at latitude and longitude coordinates, where the fit value corresponds to differences between the planned grid and the measured data grid.

15. The cellular communications system of claim 10, wherein the antenna is a steerable antenna that is automatically adjusted according to the adjustment parameters.

16. The cellular communications system of claim 10, wherein the steerable antenna is iteratively adjusted until parameters measured by the user equipment match the stored parameters.

* * * * *